United States Patent [19]

Metzner et al.

[11] Patent Number: 4,862,832
[45] Date of Patent: Sep. 5, 1989

[54] DISPENSER FOR THE APPLICATION OF ACTIVE COMPONENTS

[75] Inventors: Helmut Metzner, Pfeffingen; Alan B. Marshall, Basle, both of Switzerland

[73] Assignee: Ciba-Geigy Corporation, Ardsley, N.Y.

[21] Appl. No.: 157,826

[22] Filed: Feb. 19, 1988

[30] Foreign Application Priority Data

Feb. 27, 1987 [CH] Switzerland ............................ 753/87

[51] Int. Cl.⁴ ............................................. A01K 13/00
[52] U.S. Cl. ................................................ 119/86; 119/156
[58] Field of Search ..................... 119/156, 83, 85, 86; 132/162; 106/15.5

[56] References Cited

U.S. PATENT DOCUMENTS

| 72,558 | 12/1867 | Stimson | 132/162 |
| 1,435,911 | 11/1922 | Bechtold | 132/162 |
| 2,099,888 | 11/1937 | Hill et al. | 132/162 X |
| 2,880,129 | 3/1959 | Billings | 167/30 |
| 4,143,982 | 3/1979 | Cox et al. | 401/280 |
| 4,237,822 | 12/1980 | Kaiser, Jr. | 119/85 |
| 4,543,913 | 10/1985 | Wilkeson | 119/85 |
| 4,544,547 | 10/1985 | von Bittera et al. | 119/156 X |
| 4,576,801 | 3/1986 | Parry et al. | 106/15.5 X |
| 4,617,875 | 10/1986 | Holland | 119/85 |
| 4,685,423 | 8/1987 | Baker et al. | 119/86 |

FOREIGN PATENT DOCUMENTS 0122605 10/1984 European Pat. Off. .
2169805 7/1986 United Kingdom .

OTHER PUBLICATIONS

Derwitt Abstract, J 59187-722-A.

Primary Examiner—Robert P. Swiatek
Assistant Examiner—Nicholas D. Lucchesi
Attorney, Agent, or Firm—Edward McC. Roberts

[57] ABSTRACT

A dispenser for the application of insecticides or acaricides to the surface of animals for controlling insects and acarids on the coat of the animals and for preventing infestation by pests, distinguished by optical indication of the exhaustion of the active component.

14 Claims, 3 Drawing Sheets

FIG. 7
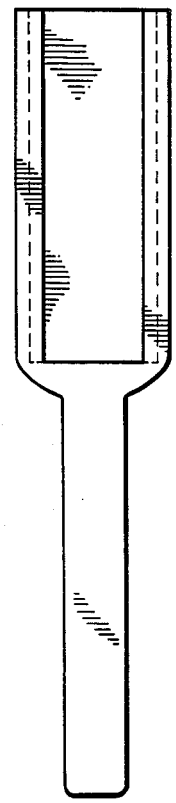
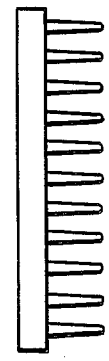
FIG. 9
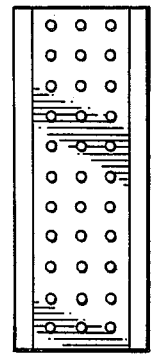
FIG. 11
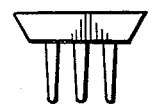
FIG. 10
FIG. 8

DISPENSER FOR THE APPLICATION OF ACTIVE COMPONENTS

The present invention relates to a dispenser for the application of insecticides or acaricides to the coat and skin of mammals. The dispenser of this invention is a device in the form of a comb, brush or curreycomb by means of which the pesticides for controlling insects and/or acarids are applied to the coat and the underlying skin of the animals to be treated and is distinguished by the feature that the exhaustion of the active component is optically indicated.

Not only animals living in the wild, but also domestic animals and productive livestock are exposed to the danger of infestation with ectoparasites. The parasites that settle especially in the coat of the animals can permanently damage the health of the infested animals by causing skin irritations and by transmitting infectious diseases. The principle ectoparasites comprise, for example, biting flies, lice, fleas and other biting and sucking insects, as well as acarids such as mites, in particular ticks.

Depending on the circumstances, the pesticides currently employed for controlling ectoparasites can be applied in a different manner.

Large animals like cattle, horses or sheep are usually treated by dipping, pour-on application or spraying with pesticidal solutions. For economic and technical reasons, however, these methods are less suitable for treating small animals and livestock, for example dogs, cats, guinea pigs, hamsters or goats. The use of these methods for treating individual large animals is likewise technically too troublesome and expensive.

To avoid the shortcomings of the above methods, especially to reduce the amount of technical work involved, dispensers for manual application have already been proposed by means of which pesticides can be applied to the coat of the treated animals.

Thus, for example, U.S. Pat. No. 4 143 982 describes a brush with perforated hollow body containing an insecticidal powder which is applied to the coat of the animal when brushed. European patent application No. 122 605 discloses a brush and a comb consisting of a polymeric material that contains insecticidal compounds which are set free and released on to the coat of the treated animal when brushed and combed. Japanese published patent application JP-A-59 187 722 (EARTH SEIYAKU K.K.) discloses a brush for combating noxious insects on animals, which brush contains 0.1 to 95% of an insecticidal compound and 5 to 99% of a waxlike or liquid substance as carrier. However, none of the proposed known dispensers has so far been able to provide an entirely satisfactory solution, suited to the present requirement, to the problem of controlling ectoparasites on the coat of animals, for the particular reason that the user—in the case of domestic animals the pet owner—is normally not an expert in the field of parasite control and, more often than not, is unable to tell when tbe comb, brush or appropriate dispenser is exhausted, i.e. no longer contains sufficient pesticide for achieving successful further control of the parasites. Hence it happens that such dispensers—especially when used by nonexperts—are applied too long, although they have meanwhile become completely inactive. The surving or newly settled parasites again form populations and once more spread. The intrinsically very effective dispensers thereby appear to become useless. The user considers them unsuitable and often resorts to more drastic methods which are less beneficial to animals and humans.

It is an object of the present invention to provide a dispenser whose use in animal treatment and care enables even the total non-expert to effect a satisfactory control of parasitic insects and acarids on the surface of animals such as the coat and underlying areas of skin. The subject matter of the invention is a manual dispenser, e.g. in the form of a comb, brush or currycomb. This dispenser consists of rigid or elatic material. It is coated with an insecticidal or acaricidal formulation. When the coat of the animal is combined, brushed or dressed down, the parasiticidal formulation is released on to the surface of the animal in an amount such that the animal is effectively freed from parasiticising insects or acarids and is furthermore given long-lasting protection from renewed parasiticisation. The special feature of the dispenser is, however, its optical indication of exhaustion, which is brought about by selecting the coating which contains the active component such that it is clearly distinguishable from the material of the teeth or bristles. When the teeth or bristles glide through the coat of the animals, the coating formulation which contains the active component comes off with increasing use and the distinctly different uncoated material of the comb, brush or currycomb is revealed, so that anyone, even a non-expert, can see at a glance that the dispenser is exhausted and needs to be replaced by a new one, if required. By appropriate choice of the pesticide concentration in the coating formulation and of the amount of coating formulation applied to the dispenser, it is possible to adapt the optimum number of strokes and the duration of action readily to the respective circumstances such that, for example, only a few strokes will suffice to ensure the elimination of a flea population and to prevent reinfestation over a desired period of time. Further, choice of the appropriate parametrs can also prevent the unnecessarily high application of pesticide that can easily be made, especially by inexperienced persons.

Accordingly, the present invention relates to a dispenser having protuberances in the form of teeth, bristles or other projecting parts for the application of an ectoparasiticidally active compound to domestic animals or productive livestock, the teeth, bristles or other projecting parts of said dispenser being wholly or partially provided with a coating formulation that contains the active component which is released to to the coat and skin of the animal to be treated when it is combinedl, brushed or dressed down, and which is optically clearly distinguished from the material of said teeth, bristles or other projecting parts, and also to a process for the preparation of said dispenser, which comprises coating the teeth, bristles or other projecting parts of said dispenser with the formulation containing the ectoparasiticidally active compound.

The clear distinction can reside in a difference in colour between the coating formulation and the material of the substrate, which distinction can be achieved by adding a colourant, for example a dye, to the coating formulation or to the material of the substrate.

A preferred embodiment of the present invention is accordingly a dispenser, wherein the material of the teeth, bristles or other projecting parts and the coating formulation containing the active component differ in colour.

A further preferred embodiment of the invention is a dispenser, wherein the coating formulation that contains the active component contains a colourant which differs from the colour of the teeth, bristles or other projecting parts and is a dye or pigment, or wherein the teeth, bristles or other projecting parts contain an additional colourant which makes both parts, namely the coating formulation on the one hand and the teeth, bristles or other projecting parts on the other, clearly distinguishable.

Within the scope of this invention, the term "clearly distinguishable" will be understood as meaning, for example, pronounced differences in colour such as black/white, red/green, blue/yellow, red/white, blue/white, brown/yellow, and complementary colours. All differences are suitable that indicate exhaustion of active component to the naked eye.

This is achieved, for example, by adding to the coating formulation, substrate or both, colourants such as dyes or pigments which are non-harmful to warm-blooded animals. It is, of course, also possible to select from the start a coating formulation that has an inherent colour, e.g. brown, which is distinct from the material of the substrate, e.g. white plastic, so that the special addition of colourant can be dispensed with.

The dispeners employed for carrying out the invention, such as a comb, brush or currycomb, can be made from the materials of natural or synthetic origin, for example from metal, rubber, tortoise shell horn, theromplastics and duroplasts, elastomers, polyolefins (e.g. polyethylene, polypropylene, or copolymers of ethylene and propylene), polyacryltes (e.g. polymyers or copolymers of methyl acrylate, ethyl acrylate, methyl methacrylate or ethyl methacrylate), polymers of vinyl compounds (e.g. polystyrene or polyvinyl chloride), polyamides, vulcanised polyisoprenes or polybutadienes, and also urea/formaldehyde resins, melamine/formaldehyde resins, epoxy resins, cellulose/plastic compounds (e.g. cellulose acetate, cellulose butyrate or cellulose nitrate) or polyurethane.

The choice of material depends on the coating formulation which contains the active component as well as on the nature of the substrate (comb, brush, currycomb), which can be longitudinal, circular, oval or rectangular in form and has one or more rows of protuberances such as teeth, bristles or other projecting parts. The body that carries the teeth, bristles or other projecting parts can be provided with a handle, but it can also be used without one. In form it corresponds in other respects to the appropriate commercially available articles used in practice for combing, brushing or dressing down.

The formulation assistants which are used for embedding and fixing the active components and which constitute a part of the coating formulation with which the dispenser (comb, brush or currycomb) is coated should be physiologically acceptable and are waxes or waxlike substances, also solid or liquid fats or fat-like substances and binders. Solid or crystalline active components generally require the use of soft and/or liquid assistants, whereas active components in liquid or paste form require hard assistants.

Suitable formulation assistants for the coating formulation are the aforementioned individual substances as well as mixtures thereof.

They comprise for example:
naturally occurring or synthetic ester waxes and their various fractions and derivatives such as beeswax, candelilla wax, carnauba wax, wool wax, wool wax alcohols, esters of montanic acid, ethylene glycol stearates or pentaerythritol stearates and others; fatty substances and fat-like substances such as triglycerides of higher fatty acids or higher fatty acids and fatty alcohols, e.g. groundnut oil, hydrogenated groundnut oil, cocoa butter, maize oil, palm oil, hydrogenated castor oil, stearin, tristearate or epoxidised soybean oil; paraffinic and, in particular, isoparaffinic waxlike substances such as ozocerites or microcrystalline waxes having a melting range from 50°–105° C.; polymer waxes such as polyethylene waxes, ethylene vinyl acetate copolymers having a melting or softening point in the range from 80°–130° C.; chloroparaffins containing 40–73% by weight of chlorine.

Preferred formulation assistants are microcrystalline wax, carnauba wax, beeswax, groundnut oil or mixtures of these substances.

If desired, the coating formulation can be coloured with a colourant which is a dye or pigment, so that a check on the presence of the active coating is possible at any time the dispenser is in use. When the colour is no longer detectable, the insecticidal or acaricidal activity of the dispenser is exhausted.

Examples of dyes or pigments suitable for this purpose are: Solvent Red 24 (C.I. 26105), Solvent Blue 35 (C.I. 61554) or Irgalite Yellow 2GP (C.I. Pigment Yellow 17).

Compounds which constitute the active component of the coating formulation for performing the invention are insecticides and acaricides, for example the naturral pyrethins, pyrethroids, chlorinated hyrocarbons, carbamates, phosphoric acid esters, thiocyanic acid esters, nitrophenol derivatives, isonitriles, diamides, amidines, triazine derivatives, phenylhydrazonepyrrolidine derivatives, phenylimidazoline derivatives or phenylbenzoylureas.

The groups of compounds listed above comprise only a selection of suitable active components and therefore constitute no limitation with respect to their use for performing the instant invention. In addition, it is possible to use further active compounds, provided they possess the suitable insecticidal and/or acaricidal properties, as active component of the coating formulation.

Examples of individual active components are: pyrethrum extract, cypermethrin, permethrin, deltamethrin, dioxacarb, propoxur, chlorpyrifos, diazinon, azamethiphos, iodofenphos, malathion, phosmet, cymiazole, amitraz, methoxychlor and cyromazine. Cypermethrin, diazinon and iodofenphos are especially preferred.

The pyrethroids are particularly suitable for synergistic mixtures. A suitable synergist is, for example, piperonyl butoxide.

The coating formulation is prepared by mixing, triturating and dispersing the components, with stirring and simultaneously heating, until a liquid homogeneous formulation is obtained. The active component is incorporated into the formulation until homogenised or dissolved therein. After homogenisation, the dropping point of the coating formulation is in the range from 50°–120° C., preferably from 60°–90° C. The cooled, solid formulation has a hardness, according to the penetration index (needle penetration according to DIN 51579), of 15 to 220. It contains 5 to 98% by weight, preferably 50 to 98% by weight, of active component.

To coat the dispenser (comb, brush, currycomb), the solid insecticidal and/or acaricidal formulation is converted into the liquid state by heating. Then the apporopriate dispenser, with the part that comes into intimate contact with the coat of the animal when brushed, is immersed in the liquid formulation, removed after a brief immersion time, allowed to drip off, and kept until the coating formulation has solidified. The coated dispenser is then kept for a time at room temperature to allow the coating to set fully. The amount of coating formulation can be regulated by varying the temperature of the fused coating formulation, the immersion time and the immersion depth.

When using the dispenser of this invention (comb, brush, currycomb provided with a coating formulation containing active component), a portion of the coating formulation, together with the active components contained therein, is released on the surface of the animal by stroking the coat of the animal to be treated with said dispenser. This procedure can be repeated several times until the coating formulation is exhausted, so that a number of animals can also be treated with one coating. The released active components can then exert their insecticidal and/or acaricidal action on and in the coat of the animal as well ason the underlying skin.

Surprisingly, it has now been found that the dispenser of this invention is preeminently suitable for controlling, with lasting effect, ectoparasites that parasiticise on the coat of animals. Such ectoparasites comprise, in particular, representatives of the orders Siphonaptera (e.g. blood-sucking fleas), Phthiraptera (e.g. blood-sucking lice), and acarina (e.g. representatives of the suborders Ixodidae, e.g. ticks, and of the genus Sarcoptes, e.g. mange mites, as well as species of the order Diptera that are parasites of animals. Typical of this order are, for example, representatives of the genus Stomoxys (e.g. stable flies).

Representative ectoparasites of domestic animals and productive livestock for the control of which the dispenser of this invention can be used with particularly good success are thus first and foremost fleas, lice, ticks, mites and flies.

A particular advantage of the present invention is that, in addition to the curative action, i.e. the elimination of parasites already present on the animals, a prophylactic action against renewed infestation by parasites is also effected by means of the treatment, the duration of said prophylactic action depending substantially on the nature and concentration of the active component and on the nature of the coat of the animal to be treated. The treatment of the animals, which likewise constitutes an object of the present invention, effects a repellent and detaching action against infesting parasites, whereby the treated animals suffer no irritation from the parasites. Hence the treated animals are protected not only against irritations which are injurious to health, but also against the transmission of infectious diseases by the parasites.

The composition of the coating formulation used for carrying out the invention is conveniently such that, when applying the dispenser of this invention, the desired ectoparasiticidal action exerted on the animal is not accompanied by any impairment of the natural aesthetic properties of the healthy, groomed coat such as gloss and handle, so that no deleterious change in the external appearance of the animal occurs. Appropriate choice of suitable auxiliary components even makes it possible to achieve an additional grooming effect on the coat of the animal.

The dispenser of this invention thus makes it possible, in easily manageable and cost-saving manner, to maintain the health and care of coated animals by direct control of the ectoparasites on the coat without having to tolerate the drawbacks that can occur when animals are subjected to ectoparasiticidal whole-body treatment by dipping, pour-on application or spraying, e.g. by wetting the sensitive external sense organs.

The use of the dispenser of this invention for controlling ectoparasites on and in the coat of animals is likewise an object of the invention.

The invention is illustrated by the following non-limitative Examples.

1. PREPARATORY EXAMPLES 1.1 Preparation of a coating formulation containing diazinon 43.0 g of technical grade diazinon (93.3%) and 7.0 g of carnauba wax are weighed into a petri dish ($\phi$=ca. 90 mm). The mixture is heated to 100°–110° C. and stirred to homogeneous brown melt (mixture M1).

1.2 Preparation of a coating formulation containing indofenphos 16.5 g of groundnut oil, 2.0 g of carnauba wax and 31.5 g of indofenphos are weighed into a petri dish ($\phi$=ca. 90 mm). The mixture is heated to 110°–120° C. and stirred to a homogeneous brown melt (mixture M2).

Where the coating formulations contain crystallising active components, e.g. indofenphos (Table 1), the coating may acquire a whitish appearance owing to crystal formation, so that it is clearly visible on a substrate having a strong inherent colour (e.g. a dark blue comb) and its detachment is readily visible to the naked eye. If desired, the coating can be coloured with a dye or pigment, so that a check can be made at any time on the presence of the active coating while the dispenser is in use. When the colour is no longer visible, the insecticidal or acaricidal activity of the dispenser is exhausted. Suitable colourants which can be added are for example: Solvent Red24 (C.I. 26 105), Solvent Blue 35 (C.I. 61 554), Irgalite Yellow BAF and many others.

The following formulations are prepared in accordance with Examples 1.1 and 1.2 and then used for coating (q.v. Tables 1 and 2):

TABLE 1

(whitish to beige coating containing iodofenphos as active component on a dark blue plastic comb)

| | Reference number | | | | | | | |
|---|---|---|---|---|---|---|---|---|
| | M2 | | M3 | | M4 | | M5 | |
| Composition | % by wt. | g | % by wt. | g | % by wt. | g | % by wt. | g |
| iodofenphos | 63.0 | 31.5 | 63.0 | 31.5 | 70.0 | 35.0 | 63.0 | 31.5 |
| groundnut oil | 33.0 | 16.5 | 33.0 | 16.5 | 26.0 | 13.0 | 33.0 | 16.5 |
| carnauba wax | 4.0 | 2.0 | | | | | 2.0 | 1.0 |
| beeswax | — | | | | 4.0 | 2.0 | | |

TABLE 1-continued (whitish to beige coating containing iodofenphos as active component on a dark blue plastic comb)

| Composition | M2 % by wt. | M2 g | M3 % by wt. | M3 g | M4 % by wt. | M4 g | M5 % by wt. | M5 g |
|---|---|---|---|---|---|---|---|---|
| (yellow) wax (microcrystalline) | — | | 4.0 | 2.0 | | | 2.0 | 1.0 |
| | 100.0 | 50.0 | 100.0 | 50.0 | 100.0 | 50.0 | 100.0 | 50.0 |
| dropping point* in °C. | 67 | | 67 | | 66 | | 68 | |
| hardness** acc. to penetrometer index | 59 | | 128 | | 60 | | 103 | |

*the dropping point is determined with a METTLER FP 53 apparatus
**the determination of hardness is made by needle penetration in accordance with DIN 51 579

TABLE 2

(white coating with titanium dioxide as colourant and cypermethrin as active component on a black plastic currycomb)

| Composition | M6 % by wt. | M6 g | M7 % by wt. | M7 g | M8 % by wt. | M8 g | M9 % by wt. | M9 g | M10 % by wt. | M10 g |
|---|---|---|---|---|---|---|---|---|---|---|
| cypermethrin (high cis 78%) | 80.0 | 40 | 60.0 | 30 | 89.0 | 44.5 | 94.0 | 47.0 | 85.4 | 42.7 |
| carnauba wax (PH flakes Pr. No. 2262) | 19.4 | 9.7 | 30.0 | 15 | 10.0 | 5 | 5.0 | 2.5 | 14.0 | 7 |
| groundnut oil (Pr. No. 6683) | | | 9.4 | 4.7 | | | | | | |
| titanium dioxide Kronos RN57B ® | 0.6 | 0.3 | 0.6 | 0.3 | 1.0 | 0.5 | 1.0 | 0.5 | 0.6 | 0.3 |
| | 100.0 | | 100.0 | | 100.0 | | 100.0 | | 100.0 | |
| dropping point* in °C. | 82.5 | | 81 | | 81 | | 80 | | 82 | |
| hardness** acc. to penetrometer index | 32 | | 24 | | 65 | | 150 | | 50 | |

*the dropping point is determined with a METTLER FP 53 apparatus
**the determination of hardness is made by needle penetration in accordance with DIN 51 579

TABLE 3

(coloured coating formulation on a white plastic subtrate)

| Composition | M11 % by wt. | M12 % by wt. | M13 % by wt. | M14 % by wt. |
|---|---|---|---|---|
| cypermethrin (high cis 78%) | 94.0 | 86.0 | 86.0 | |
| iodofenphos | | | | 63.0 |
| carnauba wax (PH flakes Pr. No. 2262) | 5.0 | 13.7 | 13.7 | 4.0 |
| groundnut oil (Pr. No. 6683) | | | | 32.7 |
| Irgalite Yellow[a] | 1.0 | | | |
| Solvent Red 24[b] | | 0.3 | | 0.3 |
| Solvent Blue 35[c] | | | 0.3 | |

[a] C.I. Pigment Yellow 17
[b] C.I. 26105
[c] C.I. 61554

1.3 Coating of a dispenser (currycomb)

The finished coating formulation is heated to 90°-100° C. until a melt is formed. The homogeneous melt is then brought to a temperature that lies 10°-20° C. above the dropping or setting point of the coating formulation and kept at this temperature. The currycomb, with the teeth pointing downwards, is then kept in the melt such that the teeth are immersed in the melt to a depth of 4-6 mm. The coated currycomb is then removed from the melt and, after excess coating composition has dripped off, is kept for several seconds in unchanged position until the coating has solidified. The coated currycomb is left, with the teeth pointing upwards, to cool and for the applied coating formulation to set. When the coating formulation has completely set, it is present on the teeth of the currycomb in an amount of ca. 1 g, to give a coating thickness on the teeth of ca. 0.5 mm.

1.4 Suitable dispensers 1.4.1 One example of a dispenser is a currycomb which is cast in one piece from polyethylene by extrusion and which conforms to a commercially available message brush. It has a flat, disclike shape, is circular to oval in contour and has an average diameter of ca. 80 mm. It is provided with a small handle on one flat side. On the other flat side there are provided 127 vertically positioned round teeth uniformly spaced over the entire surface, each 15 mm long and havig an average diameter of 1.3 mm.

1.4.2 Another example of a dispenser is a comb made of e.g. polyethylene, polyamide or other plastics materials and prepared as described in 1.4.1. This comb contains a coloured pigment has teeth 25 to 40 mm long having a cross-section of 1.5 to 5 mm and spaced at an interval of 2 to 10 mm.

2. BIOLOGICAL EXAMPLES 2.1 Test of activity against Siphonaptera (fleas)

Test animals

Dogs of different breed and crosses, including terriers, poodles and corgies.

Infestation and control thereof

The animals, in pairs, are kept in kennels (cages) which are heavily populated with fleas, thereby ensuring a continual self-infestation with fleas. The flea infestation of each dog is evaluated by counting the visible fleas in the course of a daily inspection. If no fleas are found, a further thorough investigation is made to confirm the absence of fleas.

Treatment

After determining that the animals maintain a permanent flea population, treatment of the infested animals is effected by stroking their coats with a coated currycomb (active component of the coating as indicated in Table 4). This is done by combing the animals with the number of strokes indicated in Table 4, such that the coated teeth of the currycomb are drawn through the coat on the backs of the animals from shoulder to tail. The treated dogs are then put back into the kennels and examined for flea infestation at 24 hour intervals as described above. After the coating on the currycomb is exhausted, the latter is replaced by a fresh one.

FIGS. 7 to 11 relate to a bipartite currycomb consisting of a holding device and an insert;

FIG. 7 is a cross section of the holding device;

FIG. 8 is the top view of the holding device;

FIG. 9 is a longitudinal-sectional view of the insert;

FIG. 10 is a cross-sectional view of the insert; and

FIG. 11 is the top view of the insert;

FIGS. 12 to 14 are a fragmentary diametrical view of the currycomb according to FIGS. 5 and 6:

FIG. 12 is the view before coating: 1=part of the handling, 2=teeth;

FIG. 13 is the view after coating: 2=teeth, 3=coating, 4=border-line showing the depth of immersion into the melt of the coating formulation in the preparation of the coated currycomb; and FIG. 14 is the view after application of the currycomb and near to exhaustion of the coating: 5=minor residuals of coating at the teeth.

What is claimed is:

1. A dispenser having protuberances in the form of teeth, bristles or other projecting parts for the application of an ectoparasiticidally active compound to domestic animals or productive livestock, the teeth, bristles or other projecting parts of said dispenser being externally coated wholly or partially with a solidified coating formulation containing the ectoparasiticidally active compound which is released on to the coat of the animal to be treated when it is combed, brushed or dressed down, and which is distinguished optically from the material of said teeth, bristles or other projecting parts.

2. A dispenser according to claim 1, wherein the material of the teeth, bristles or other projecting parts and the coating formulation ontaining the active com-

TABLE 4

| Coating with active component | Number of fleas per dog before treatment | Results Application (number of strokes with the currycomb) | Time in hours until flea reduction to zero | Free from fleas after treatment (number of days) |
|---|---|---|---|---|
| cypermethrin | 5 | 20 | <24 | 20 |
|  | 15 | 15 | <24 | 18 |
|  | 16 | 10 | >24 | 6 |
| diazinon | 7 | 20 | <24 | 20 |
|  | 3 | 20 | <24 | 22 |
|  | 25 | 10 | <24 | 10 |
|  | 30 | 10 | <24 | 17 |
| iodofenphos | 9 | 20 | <24 | 18 |
|  | 4 | 20 | <24 | 20 |
|  | 14 | 10 | <24 | 11 |
|  | >30 | 10 | <24 | 11 |
|  | >30 | 2 | <24 | 11 |
|  | >30 | 2 | <24 | 13 |
|  | 22 | 2 | <24 | 13 |
|  | 25 | 2 | <24 | 13 |

DESCRIPTION OF THE DRAWINGS

FIGS. 1 to 14 relate to dispensers suitable according to the instant invention.

FIG. 1 is a longitudinal-sectional view of a comb;

FIG. 2 is the top view of the comb according to FIG. 1;

FIG. 3 is a longitudinal-sectional view of a single-piece currycomb;

FIG. 4 is the top view of the currycomb according to FIG. 3;

FIG. 5 is the top view of a single-piece currycomb;

FIG. 6 is the diametrical view of the currycomb according to FIG. 5;

Figure 1:
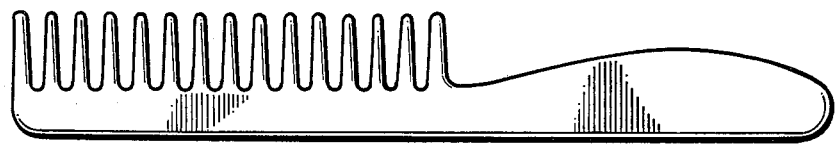
Figure 2:
Figure 3:
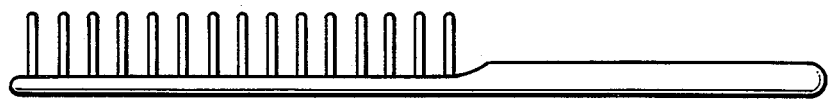
Figure 4:
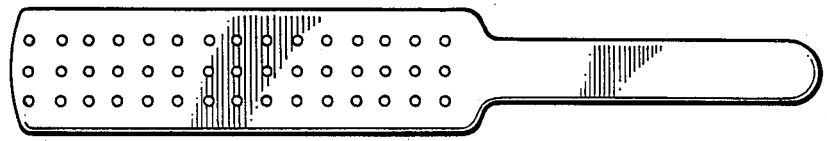
Figure 5:
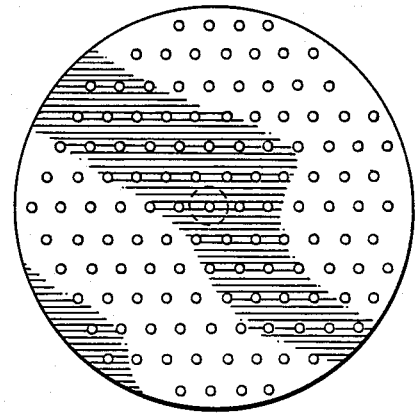
Figure 6:
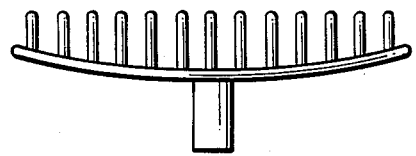
Figure 12:
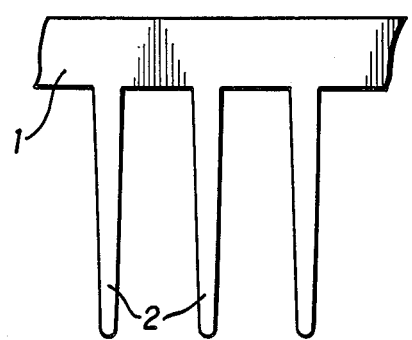
Figure 13:
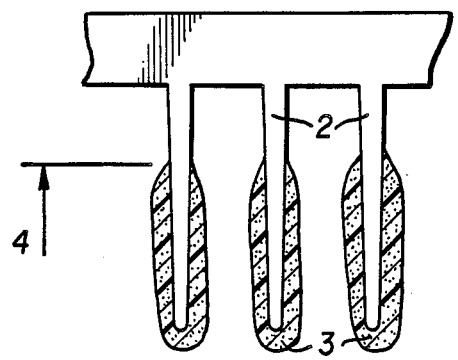
Figure 14:
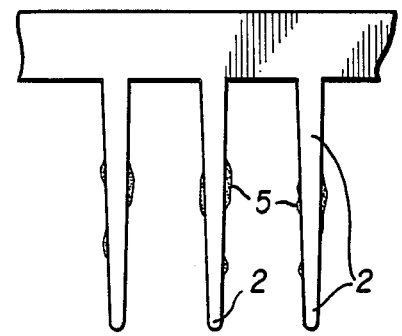

ponent differ in colour.

3. A dispenser according to claim 2, wherein the coating formulation containing the active component contains a colourant that differs from the inherent colour of the teeth, bristles or other projecting parts and is a dye or pigment.

4. A dispenser according to claim 1, wherein the coating formulation contains at least one active component selected from the group consisting of natural pyrethrins, pyrethroids, chlorinated hydrocarbons, carbamates, phosphoric acid esters, thiocyanic acid esters, nitrophenol derivatives, isonitriles, diamides, amidines, triazine derivatives, phenylhydrazonepyrrolidine derivatives, phenylimidazoline derivatives or phenylbenzoylureas.

5. A dispenser according to claim 4, wherein the coating formulation contains at least one active component selected from the group consisting of cypermethrin, diazinon and iodofenphos.

6. A dispenser according to claim 1, wherein the coating formulation contains as formulation assistants one or more of the group consisting of waxes, waxlike substances, solid or liquid fats, fat-like substances and binders.

7. A dispenser according to claim 6, wherein the coating formulation contains as formulation assistant microcrystalline wax, carnauba wax, beeswax, groundnut oil or a mixture thereof.

8. A dispenser according to claim 1, wherein the coating formulation contains the active component in an amount of 5 to 98% by weight.

9. A dispenser according to claim 8, wherein the coating formulation contains the active component in an amount of 50 to 98% by weight.

10. A dispenser according to claim 1, wherein the dropping point of the coating formulation is in the range from 50°–120° C.

11. A dispenser according to claim 10, wherein the dropping point is in the range from 60°–90° C.

12. A dispenser according to claim 1, wherein the solidified coating formulation has a hardness according to the penetrometer index of 15 to 220, determined by needle penetration in accordance with DIN 51 579.

13. A method of controlling ectoparasites, which comprises the use of a dispenser according to claim 1 for controlling ectoparasites on domestic animals or productive livestock by treating the coat of said animals or livestock.

14. A method according to claim 13 of controlling ectoparasites, which comprises the use of the dispenser as claimed in claim 1 for combing, brushing or dressing down the coat of warm-blooded animals.

* * * * *